(12) United States Patent
Hung

(10) Patent No.: US 8,727,641 B2
(45) Date of Patent: May 20, 2014

(54) OPTICAL CONNECTOR

(71) Applicant: Hon Hai Precision Industry Co., Ltd., New Taipei (TW)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/747,305

(22) Filed: Jan. 22, 2013

(65) Prior Publication Data

US 2014/0079358 A1    Mar. 20, 2014

(30) Foreign Application Priority Data

Sep. 14, 2012    (TW) .............................. 101133808 A

(51) Int. Cl.
    *G02B 6/36*    (2006.01)

(52) U.S. Cl.
    USPC ................ 385/93; 385/53; 385/88; 385/89; 385/92; 385/94

(58) Field of Classification Search
    USPC ............... 385/53, 88, 89, 92, 93, 94
    See application file for complete search history.

(56) References Cited

U.S. PATENT DOCUMENTS 6,269,203 B1 *   7/2001   Davies et al. ................... 385/24
8,303,195 B2 *   11/2012   Adachi et al. .................. 385/93

* cited by examiner

*Primary Examiner* — Jennifer Doan
(74) *Attorney, Agent, or Firm* — Novak Druce Connolly Bove + Quigg LLP

(57) ABSTRACT

An optical connector includes a substrate, a photoelectric element and a positioning element on the substrate, a lens element, and an optical fiber. The positioning element defines a through hole, in which the photoelectric element is received to allow visual inspection for determining if the photoelectric element is positioned to a designated position in relation to the positioning element, and includes a positioning structure. The lens element includes an incident surface, an emitting surface, a reflecting surface, a locating structure and a first lens formed in the incident surface, and a second lens formed on the emitting surface and optically aligned with the first lens via the reflecting surface. The lens element is precisely positioned on the positioning element by matching the locating structure with the positioning structure, to align the first lens with the photo electric element. The optical fiber is aligned with the second lens.

9 Claims, 2 Drawing Sheets

OPTICAL CONNECTOR

BACKGROUND

1. Technical Field

The present disclosure relates to an optical connector.

2. Description of Related Art

Optical connectors include a substrate, a photoelectric element, such as a laser diode and a photo diode, a case having lenses, and an optical fiber. The photoelectric element and the case are positioned on the substrate. The case covers the photoelectric element and aligns the lenses with the photoelectric element and the optical fiber. That is, the photoelectric element is optically coupled to the optical fiber via the lenses and, as such, the photoelectric element can emit or receive light from the optical fiber via the lenses to reduce insertion loss. However, in assembly, it is difficult or inconvenient to make sure that the photoelectric element is precisely aligned with the lenses as the photoelectric element is concealed by the case.

Therefore, it is desirable to provide an optical connector, which can overcome the above-mentioned problems.

BRIEF DESCRIPTION OF THE DRAWINGS

Many aspects of the present disclosure can be better understood with reference to the following drawings. The components in the drawing are not necessarily drawn to scale, the emphasis instead being placed upon clearly illustrating the principles of the present disclosure.

DETAILED DESCRIPTION

Embodiments of the present disclosure will be described with reference to the drawings.

Figure 1:
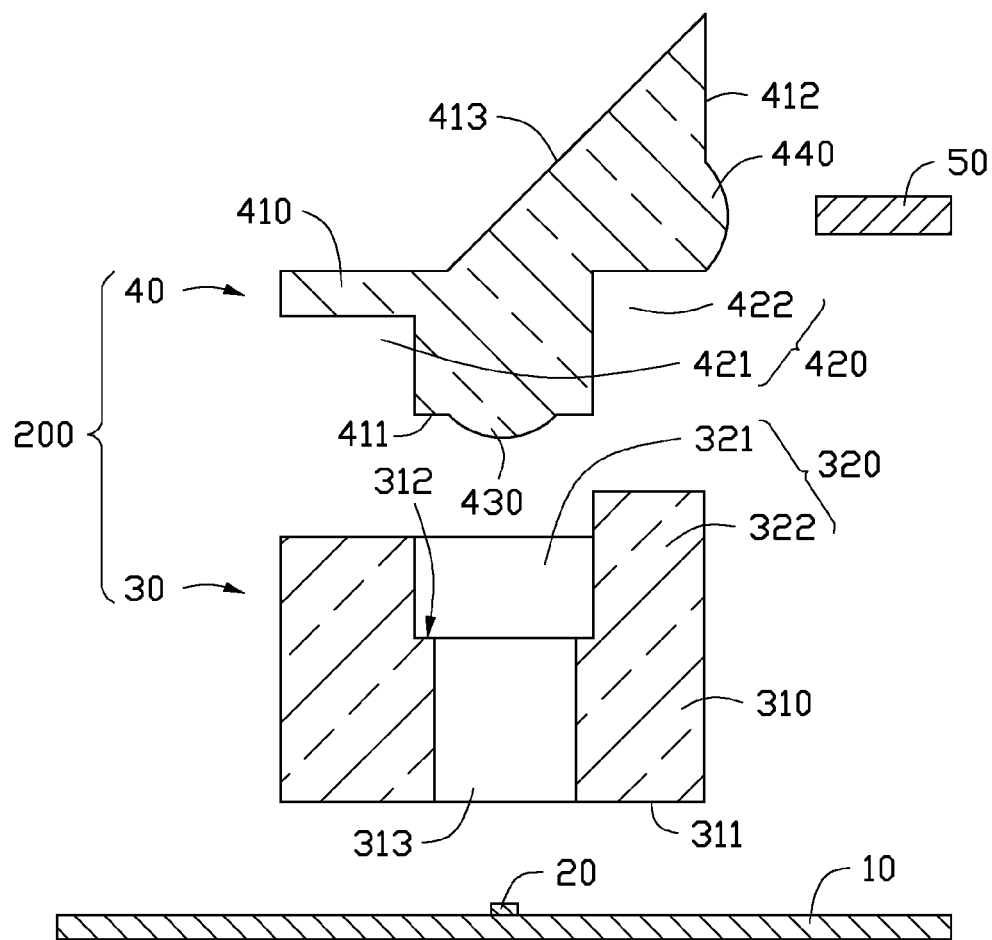
FIG. 1 is a cross-sectional exploded schematic view of an optical connector, according to an embodiment.
Figure 2:
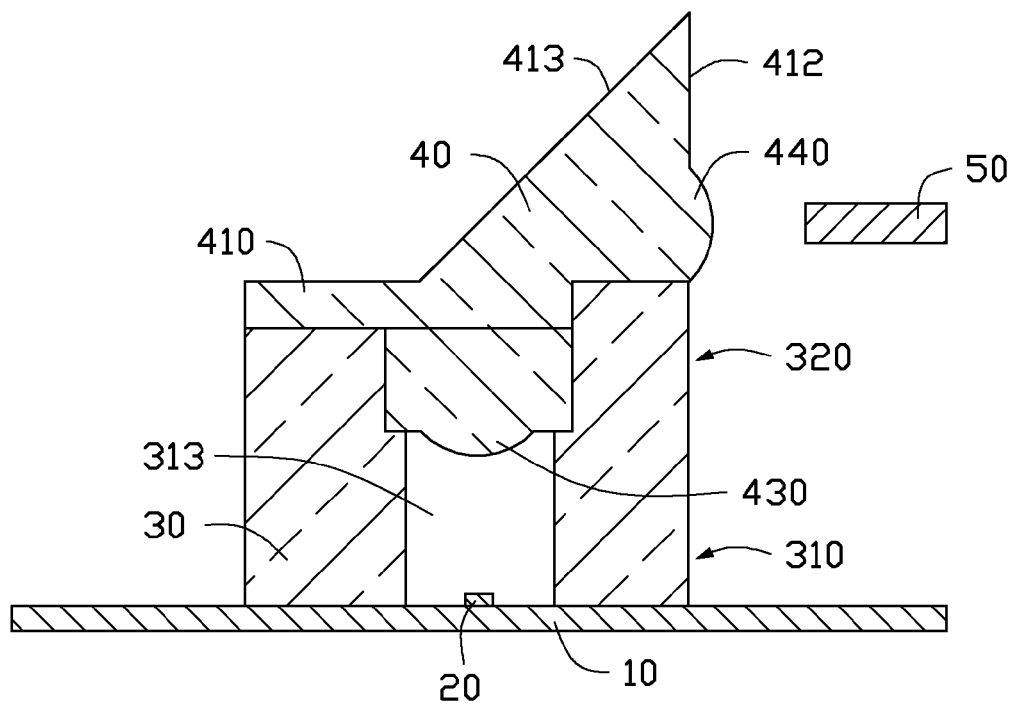
FIG. 2 is a cross-sectional schematic view of the optical connector of FIG. 1.

FIGS. 1-2 show an optical connector 100 in accordance with an embodiment of the present disclosure. The optical connector 100 includes a substrate 10, a photoelectric element 20, a case 200, and an optical fiber 50.

The substrate 10 can be a printed circuit board, or silicon or ceramic substrate form with circuits (not shown).

The photoelectric element 20 can be a light emitter, such as a laser diode, for emitting light, or a photo detector, such as a photo diode, for gathering light.

The case 200 includes a positioning element 30 and a transparent lens element 40.

The positioning element 30 can be made of transparent or opaque materials. In this embodiment, the positioning element is made of transparent materials. The positioning element includes a base 310 which is substantially a rectangular block and includes a first surface 311 and a second surface 312 opposite to the first surface 311. The base 310 defines a substantially through hole 313 running through the first surface 311 and the second surface 312. In this embodiment, the through hole 313 is generally rectangular, and positioned at centers of the first surface 311 and the second surface 312, and extends along a direction that is substantially perpendicular to the first surface 311 and the second surface 312.

The positioning element 30 also includes a positioning structure 320 formed on the second surface 312. In this embodiment, the positioning structure 320 is a protrusion protruding from a periphery of the first surface 311, and includes a first positioning portion 321 and a second positioning portion 322. The first positioning portion 321 includes three rectangular blocks aligned with three of four sides of the first surface 311. The second positioning portion 322 includes a rectangular block aligned with the other side of the first surface 311. A height of the first positioning portion 321 is smaller than a height of the second positioning portion 322.

The lens element 40 includes a main body 410. The main body 410 includes an incident surface 411, an emitting surface 412, and a reflecting surface 413. Light entering into the incident surface 411 is directed to the emitting surface 412 via total internal reflection on the reflecting surface 413. In this embodiment, the main body 410 is substantially a wedged block, the emitting surface 412 is perpendicular to the incident surface 411. The reflecting surface 413 connects between the incident surface 411 and the emitting surface 412 and is tilted at about 45 degrees relative to the emitting surface 412.

The lens element 40 defines a locating structure 420, structurally matching the positioning structure 320, in the incident surface 411. As such, the locating structure 420 and the positioning structure 320 precisely locate the lens element 40 on the positioning element 30 (i.e., the second surface 312). In this embodiment, to correspond to the positioning structure 320, the locating structure 420 is a cutout structurally matching the positioning structure 320 and includes a first locating portion 421 structurally matching with the first positioning portion 321 and a second locating portion 422 structurally matching with the second positioning portion 322.

The lens element 40 also includes a first lens 430 and a second lens 440. The first lens 430 is formed on the incident surface 411. The second lens 440 is formed on the emitting surface 412 and is optically aligned with the first lens 430 via the reflecting surface 413.

In assembly, the photoelectric element 20 is positioned on and electrically connected to the substrate 10. Then, the positioning element 30 is placed on the substrate 10, the first surface 311 contacts the substrate 10, and the photoelectric element 20 is thus received in the through hole 313. The photoelectric element 30 is located at a designated position in relation to the positioning element 20, i.e., a center of the through hole 312. Next, the positioning element 30 is fixed and the lens element 40 is located on the positioning element 30. The first lens 430 is precisely aligned with the photoelectric element 20, provided that photoelectric element 30 is located at the designated position in relation to the positioning element 20. Finally, the optical fiber 50 is arranged to align with the second lens 440.

The through hole 313 is not limited to this embodiment but can take other suitable configurations. For example, the through hole in other embodiments can have other shapes, such as circular, and be positioned other positions other than the center of the first surface 311.

The first positioning portion 321 and the second positioning portion having different heights facilitate the correct orientation of the lens element 40 on the positioning element 30. However, the design of the positioning structure 320 and the locating structure 420 is not limited to that of this embodiment. The positioning structure 320 can take other suitable configurations, and the locating structure 420 can take other configurations structurally matching with the configuration of the positioning configuration. For example, in other embodiments, the positioning structure can be a cutout while the locating structure is a protrusion matching with the cutout.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An optical connector, comprising:
   a substrate;
   a photoelectric element positioned on the substrate;
   a case comprising:
      a positioning element comprising:
         a base comprising a first surface and a second surface opposite to the first surface, the base defining a through hole running through the first surface and the second surface, the base being positioned on the substrate, the first surface contacting the substrate, the photoelectric element being received in the through hole and positioned at a pre-designed positioned in relative to the positioning element; and
         a positioning structure formed on the second surface;
      a transparent lens element comprising:
         a main body comprising an incident surface, an emitting surface, and a reflecting surface, light entering into the incident surface being directed to the emitting surface via total internal reflection on the reflecting surface;
         a locating structure structurally matching with the positioning structure, the lens element being precisely located on the positioning element by a cooperation between the locating structure and the positioning structure, the incident surface contacting the second surface;
         a first lens formed on the incident surface and aligned with the photoelectric element;
         a second lens formed on the emitting surface and optically aligned with the first lens via the reflecting surface; and
   an optical fiber arranged to aligned with the second lens.

2. The optical connector of claim 1, wherein the substrate is a printed circuit board.

3. The optical connector of claim 1, wherein the photoelectric element is selected from the group consisting of a light emitter and a photo detector.

4. The optical connector claim 3, wherein the light emitter comprises a laser diode.

5. The optical connector of claim 3, wherein the photo detector comprises a photo diode.

6. The optical connector of claim 1, wherein the positioning element is made of transparent or opaque materials.

7. The optical connector of claim 1, wherein the through hole is generally rectangular, and positioned at centers of the first surface and the second surface, and extends along a direction that is substantially perpendicular to the first surface and the second surface.

8. The optical connector of claim 1, wherein the positioning structure is a protrusion protruding from a periphery of the first surface, and comprises a first positioning portion and a second positioning portion, the first positioning portion comprises three rectangular blocks aligned with three of four sides of the first surface, the second positioning portion comprises a rectangular block aligned with the other side of the first surface, and a height of the first positioning portion is smaller than a height of the second positioning portion.

9. The optical connector of claim 1, wherein the main body is substantially a wedged block, the emitting surface perpendicularly connects the incident surface, and the reflecting surface connects between the incident surface and the emitting surface and is tilted at about 45 degrees in relative to the emitting surface.

* * * * *